May 23, 1961 L. E. THIESS 2,984,887
APPARATUS FOR MANUFACTURING CERAMICS
Filed Jan. 30, 1958
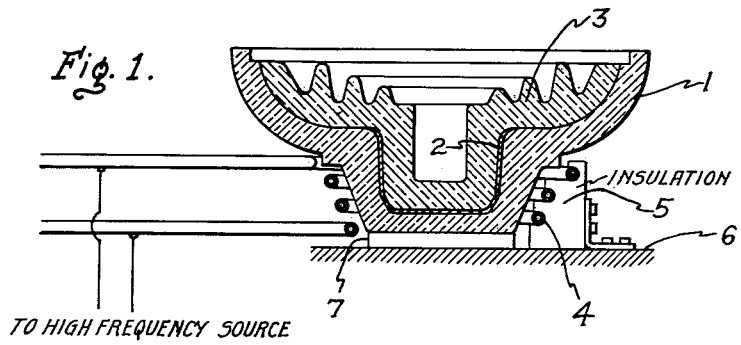
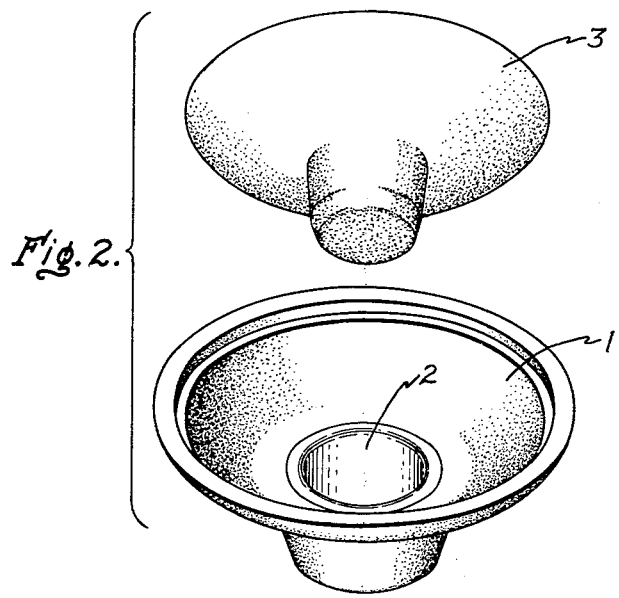
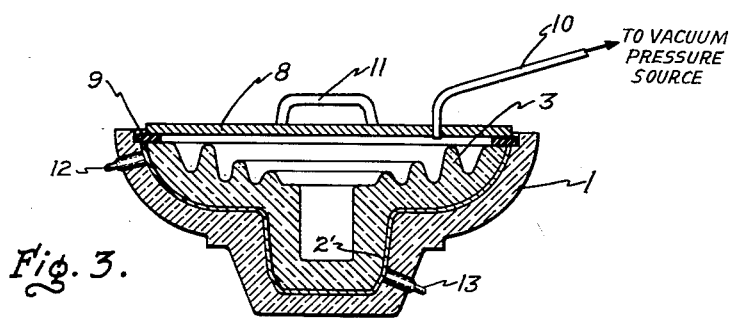
Inventor
Ludwig E. Thiess,
by Gilbert P. Tarleton
His Attorney.

United States Patent Office 2,984,887
Patented May 23, 1961

2,984,887
APPARATUS FOR MANUFACTURING CERAMICS

Ludwig E. Thiess, Baltimore, Md., assignor to General Electric Company, a corporation of New York Filed Jan. 30, 1958, Ser. No. 712,127
1 Claim. (Cl. 25—129)

This invention relates to an apparatus and method for manufacturing ceramics, and more particularly, to an improved porous mold for manufacturing ceramic ware and to an improved method of releasing plastic ceramic ware from their molds.

In the electrical ceramic industry it is well known to form ceramic electrical insulators by hot plunging methods. One type of electrical insulator which is so formed is the suspension insulator which is generally bell-shaped. The bell-shape has a raised crown and is hollow on the inside. The cavity in the crown is known as the pinhole, and the remainder of the underside of the insulator is corrugated.

This type of insulator can be formed by taking a blank of plastic or green clay and first rolling or pressing it into a conical shape. Then it is positioned in an upright position in a plaster of Paris mold with its tapered end down. Then the clay is partially pressed or tamped into the mold. After this a hot rotating die is plunged into the clay to give it its final shape. Then the formed pieces are set aside in their molds for conditioning and finishing. Conditioning comprises removing some of the water of plasticity from the pieces so they can be separated from their molds.

The formed pieces cannot be removed from their molds immediately after they have been formed since they are still in a plastic condition and they stick to their molds. The adhesion between the plastic pieces and their molds is strong enough so that the clay pieces cannot be removed without literally tearing them out which of course destroys them.

The mold drying process can take from say 45 minutes to several hours. This will depend upon the shape and size of the piece and other factors such as the type of drying apparatus and drying rate used. Air drying can be used but this is more time consuming. The drying apparatus can comprise an arrangement of blowers and heaters. Although this is faster it is more costly. In either event, the molds are not available right away for re-use. This means that a large number of molds are required as well as considerable factory space for drying which raises the manufacturing costs.

The drying rate cannot be accelerated very rapidly because there is a temperature limit to which the plaster of Paris molds can be safely heated. If they are heated beyond this limit, which is about 150° F., they will be dehydrated and disintegrate.

The plaster of Paris molds are porous. Therefore, they will absorb some of the water of plasticity of the pressed ceramic pieces along the interface between the pieces and their molds. This causes the pieces to shrink away from their molds. After this happens the pieces are removed from their molds by inverting the molds. This operation has to be conducted with some degree of care lest the pieces be chipped, cracked or otherwise deformed by rough handling.

At this point the molds may not be ready for immediate re-use. Cold and wet molds will not absorb much water. For this reason drying of the pieces and their molds is conducted in a moderately heated and circulating atmosphere. However, for a similar reason the molds may have to be further dried after they have been emptied in order to remove the water they have absorbed.

After the pieces are removed from the molds they are finished, further dried, glazed, and then fired to vitrification.

It is an object of this invention to provide an improved apparatus and method for manufacturing ceramic ware.

It is a further object of this invention to provide an improved high strentgh light weight and high temperature porous mold for manufacturing ceramic ware which can conveniently, economically and quickly shrink plastic ceramic ware within the mold for fast release of the ceramic ware from the mold, and which can be re-used without reconditioning.

It is a further object of this inventiton to provide an improved apparatus and method for releasing and removing ceramic ware from their molds.

My invention comprises shrinking plastic ceramic ware from their molds by electromagnetic induction heating or electric resistance heating. This is accomplished by providing porous molds with internal conducting surfaces. The conducting surfaces will be heated when the molds are placed in a high frequency electromagnetic field or when an electric current is directly passed through the conducting surfaces. The conducting surfaces may comprise conducting coatings, liners, inserts or their equivalents in the porous molds. Such coatings, liners, inserts or their equivalents can cover all or less than all of the mold surface. For best results the conducting surfaces should be porous although this is not absolutely necessary when they cover less than all of the inner mold surface.

The features of my invention which I believe to be novel are set forth with particularity in the appended claim. My invention itself, however, both as to its organization and method of operation, together with further objects and advantages thereof, may best be understood by reference to the following description taken in connection with the accompanying drawing in which:

Figure 1 is an illustration of one form of my invention;

Figure 2 is a perspective view of the separated insulator and mold of Fig. 1; and Fig. 3 is an illustration of another form of my invention.

Like reference numerals will be used throughout the various figures to indicate similar parts.

Referring now particularly to Fig. 1, shown therein is one form of my invention which comprises a porous ceramic mold 1 having a porous metallic coating 2 in its bottom. The mold is adapted to have a suspension electrical insulator 3 formed therein. The forming is done by the prior art practice of forcing a not shown hot rotating die into a conical shape of plastic clay.

After the forming operation the mold with its formed piece is positioned in an induction coil 4 which is connected to a source of high frequency electrical energy. The turns of the coil may be spaced from each other by an insulating spacer 5 to prevent short circuiting the coil turns. The coil and spacer may be supported on a support 6 which has a pedestal 7 for the mold. The coil 4 may be made hollow for the circulation of water therethrough. This is for the purpose of preventing overheating the coil.

When the mold is placed in the coil 4 and the coil is energized at a high electrical frequency the magnetic field of the coil induces circulating currents in the porous liner 2. These currents result in heating of the liner 2.

However, electric current can be directly passed through the liner in a manner to be explained in connection with Fig. 3. When the liner is heated sufficient water of plasticity of that part of the insulator which is contacted by the mold is vaporized and absorbed by the porous mold and its liner. This results in some hardening of the outer surface of the insulator and shrinking of this surface from the mold surface. Therefore, when the mold is inverted the insulator will readily fall out.

Ten inch diameter suspension insulators have been successfully released from their molds in the above manner in a time interval of about 30 to 35 seconds with a 5 kilowatt elecetronic type induction heater operating at a frequency and current of 430 kilocycles and 35 amperes respectively. The temperature rise for said time interval was from about 75° F. to about 124° F. However, this temperature can be raised up to approximately 200° F. if so desired.

Since plaster of Paris molds cannot be safely heated above 150° F., and since the upper temperature reached during induction heating is fairly high and may exceed 150° F., my invention requires a high temperature porous ceramic mold instead of prior art plaster of Paris molds. One suitable high temperature porous ceramic mold composition is disclosed and claimed in my Patent 2,809,898 which is assigned to the same assignee as the instant patent application. It consists essentially of 25 to 27% ball clay, 10 to 28% china clay, and 65 to 45% calcined alumina by weight. This composition has a pore volume of 36 to 48% and the pore volume can be more easily controlled than in plaster of Paris. Also, it has a moisture absorption capacity of 24 to 34% which is higher than for plaster of Paris. Its tensile strength is about 580 p.s.i. which is about 50% higher than plaster of Paris, and it is much lighter in weight than equivalent plaster of Paris molds. Also, it can be heated to much higher temperatures than plaster of Paris. For instance, can it be safely heated to well over 200° F. whereas at this temperature plaster of Paris would be completely dehydrated and disintegrate.

The metallic or conducting liner 2 can be formed in several ways. It can be a sprayed coating such as a copper coating which is formed by the Schoop process. Also, it can be a painted coating. The latter can be formed by painting a metallic paste, such as for instance du Pont silver paste No. 4545, on the mold bottom. Then the mold is refired to about 1250° F. In this refiring the lacquer vehicle is burned out and the silver is sintered hard and permanently to the mold.

For best results the coating should be light but continuous to prevent peeling. Porous coatings made by the above methods and having a thickness of 15 to 30 mils have been satisfactory. However, the coating need not necessarily be bonded to the mold, but it can be a cup or other shaped insert which is preformed and then put in position. Additionally, the liner need not absolutely be made porous when only part of the mold is lined since the unlined part of the porous mold will absorb the evolved vapors. However, best results have been obtained with porous liners and this is preferred.

In the second form of the invention the whole inside surface of the mold 1 is covered with liner 2'. When this is done the liner 2' should be porous. The liner 2' will permit heating the sides as well as the bottom of the mold cavity by electromagnetic induction. The sides alone may be heated. However, sticking of the clay to the mold is more troublesome at the bottom than along the sides. Therefore, when a full liner is used best results will be obtained if the bottom is always heated with or without heating of the sides. That is, the Fig. 3 mold can be heated by a coil such as shown in Fig. 1 or a similar coil with a few more turns to cover the sides of the mold as well. Additionally, the molds of either Fig. 3 or 1 can be heated by electric resistance heating of their conducting surfaces, that is, by directly passing alternating or direct current through their conducting surfaces. This can be accomplished by connecting terminals, such as illustrated by elements 12 and 13 of Fig. 3, to the conducting liner and then connecting a source of direct or alternating electrical energy thereto. Obviously, the terminals should be positioned so that the current will distribute itself so as to get even and total heating of the mold.

The mold of Fig. 3 can be emptied by inverting it as explained heretofore. However, the disadvantages of manual emptying and possible distortion of the piece can be overcome by the vacuum lifting tool shown in Fig. 3. It may comprise a plate 8 which has a seal 9 or the like on its underside which is shaped to engage all of the upper edge of the insulator 3. A conduit 10 which is connected to a source of vacuum pressure evacuates the inside of the insulator when the plate 8 is placed over the insulator. Therefore, when the plate 8 which may be provided with a handle 11 is raised the insulator 3 will be lifted evenly out of the mold. In this manner inversion of the mold and manual handling of the plastic piece is avoided.

As heretofore noted, the conducting liner must be porous when it covers all of the inner mold surface, but may be non-porous when it covers less than all of the inner mold surface. Therefore, by the term liner which covers at least a part of the mold is meant one which may cover all of the mold if it is porous, but only a part if it is non-porous. Also, since electromagnetic induction or resistance heating of the liner can be used, the term electric heating is intended to include both.

While there have been shown and described particular embodiments of the invention, it will be obvious to those skilled in the art that changes and modifications may be made without departing from the invention and, therefore, it is intended by the appended claim to cover all such changes and modifications as fall within the true spirit and scope of the invention.

What I claim as new and desire to secure by Letters Patent of the United States is:

Mold apparatus for molding ceramic ware and adapted for readily releasing the molded ceramic ware therefrom comprising, in combination, a porous ceramic mold member having a surface defining a mold cavity therein for receiving plastic ceramic-forming material, said mold member being characterized by high temperature resistance and high moisture absorption capacity, and means associated with said mold member for heating the surface of the plastic material adjacent said mold surface, said heating means including porous metallic material lining at least part of said mold surface and electrical means for generating heat in said porous metallic material, whereby when the plastic material in the mold cavity is heated by contact with said porous metallic material, said adjacent surface thereof shrinks away from said mold surface and the molded ceramic product is thereby readily released therefrom.

References Cited in the file of this patent

UNITED STATES PATENTS

| | | |
|---|---|---|
| 1,592,536 | O'Neill | July 13, 1926 |
| 1,987,336 | Powell | Jan. 8, 1935 |
| 2,026,624 | Flower | Jan. 7, 1936 |
| 2,273,015 | Bower | Feb. 17, 1942 |
| 2,291,862 | Bailey | Aug. 4, 1942 |
| 2,317,597 | Ford et al. | Apr. 27, 1943 |
| 2,401,582 | Owen | June 4, 1946 |
| 2,522,298 | Ramsay | Sept. 12, 1950 |
| 2,809,898 | Thiess | Oct. 15, 1957 |

FOREIGN PATENTS

| | | |
|---|---|---|
| 1,114,683 | France | Dec. 19, 1955 |
| 1,140,221 | France | Feb. 25, 1957 |
| 668,266 | Great Britain | Mar. 12, 1952 |